(12) United States Patent
Tsai et al.

(10) Patent No.: US 10,510,492 B2
(45) Date of Patent: Dec. 17, 2019

(54) MULTILAYER CERAMIC CAPACITOR WITH LOW ACOUSTIC NOISE

(71) Applicant: Apple Inc., Cupertino, CA (US)

(72) Inventors: Ming Y. Tsai, San Jose, CA (US); Albert Wang, Sunnyvale, CA (US); Curtis C. Mead, Sacramento, CA (US); Tyler S. Bushnell, San Francisco, CA (US); Paul A. Martinez, Morgan Hill, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/600,329

(22) Filed: May 19, 2017

(65) Prior Publication Data

US 2018/0337003 A1 Nov. 22, 2018

(51) Int. Cl.
*H01G 4/35* (2006.01)
*H01G 4/12* (2006.01)
*H01G 4/30* (2006.01)
*H01G 4/012* (2006.01)
*H01G 4/232* (2006.01)

(52) U.S. Cl.
CPC .............. *H01G 4/35* (2013.01); *H01G 4/012* (2013.01); *H01G 4/12* (2013.01); *H01G 4/232* (2013.01); *H01G 4/30* (2013.01)

(58) Field of Classification Search
CPC ............ H01G 4/35; H01G 4/005; H01G 4/12; H01G 4/30; H01L 41/0472
USPC ......................................................... 361/321.2
See application file for complete search history.

(56) References Cited

U.S. PATENT DOCUMENTS

| | | | |
|---|---|---|---|
| 9,330,849 B2 | 5/2016 | Gong et al. | |
| 2007/0109717 A1* | 5/2007 | Lee ........................ | H01G 4/012 361/303 |
| 2007/0182277 A1* | 8/2007 | Doshida ................. | G02B 7/102 310/311 |
| 2010/0039750 A1* | 2/2010 | Togashi .................. | H01G 4/005 361/303 |
| 2013/0201603 A1 | 8/2013 | Chung et al. | |
| 2014/0166351 A1 | 6/2014 | Lee et al. | |
| 2015/0302993 A1 | 10/2015 | Park et al. | |
| 2015/0310991 A1 | 10/2015 | Ning et al. | |
| 2015/0325371 A1 | 11/2015 | Hattori | |
| 2015/0364253 A1 | 12/2015 | Arnold et al. | |
| 2017/0148571 A1* | 5/2017 | Akada ..................... | H01G 4/30 |

* cited by examiner

*Primary Examiner* — Michael P McFadden
(74) *Attorney, Agent, or Firm* — Fletcher Yoder PC

(57) ABSTRACT

Monolithic capacitor structures having a main capacitor and a vise capacitor are discussed. The vise capacitor provides to the monolithic capacitor structure reduced vibrations and/or acoustic noise due to piezoelectric effects. To that end, vise capacitor may cause piezoelectric deformations that compensate the deformations that are caused by the electrical signals in the main capacitor. Embodiments of these capacitor structures may have the main capacitor and the vise capacitor sharing portions of a rigid dielectric. Electrical circuitry that employs the vise capacitor to reduce noise and/or vibration in the monolithic capacitor structures is also described. Methods for fabrication of these capacitors are discussed as well.

17 Claims, 17 Drawing Sheets

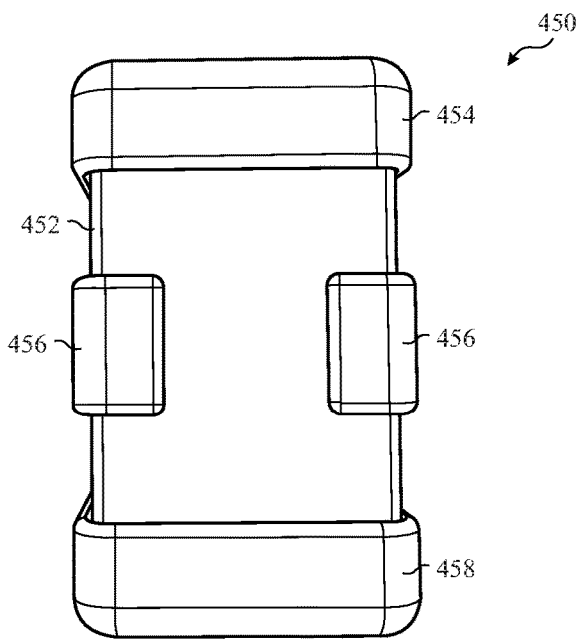
*FIG. 12A*
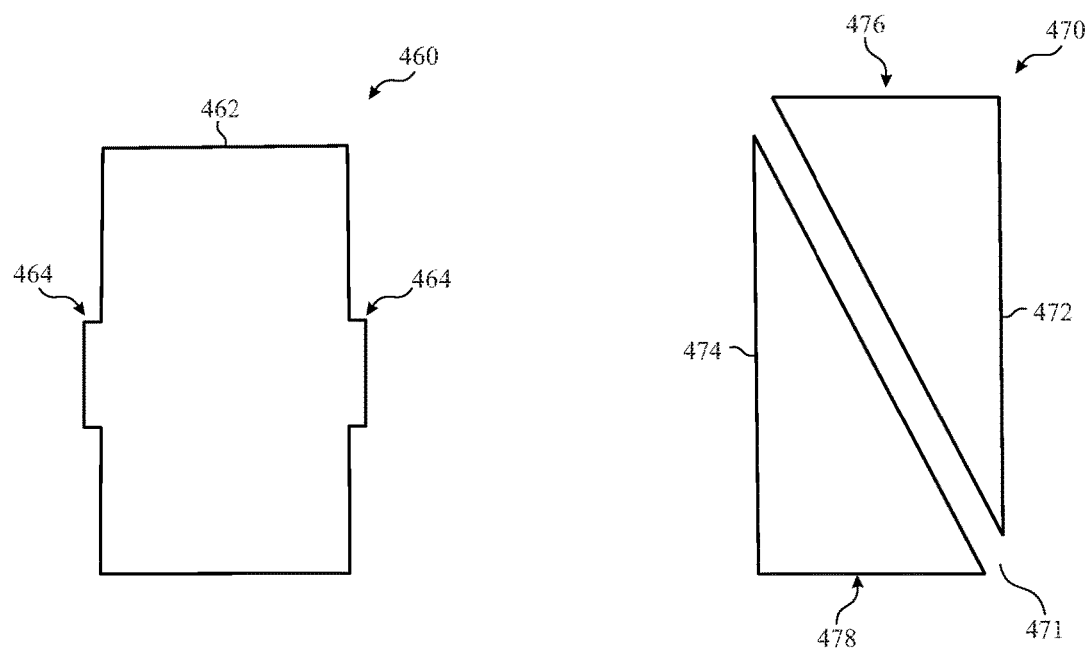
*FIG. 12B*  *FIG. 12C*

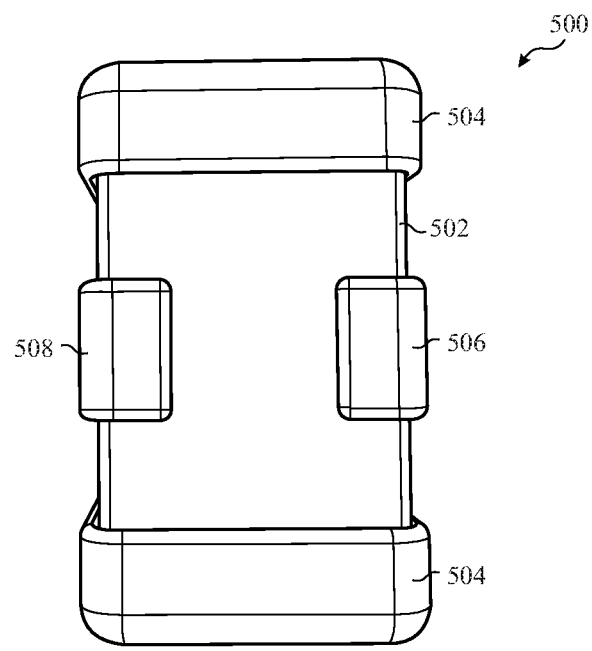
*FIG. 13A*
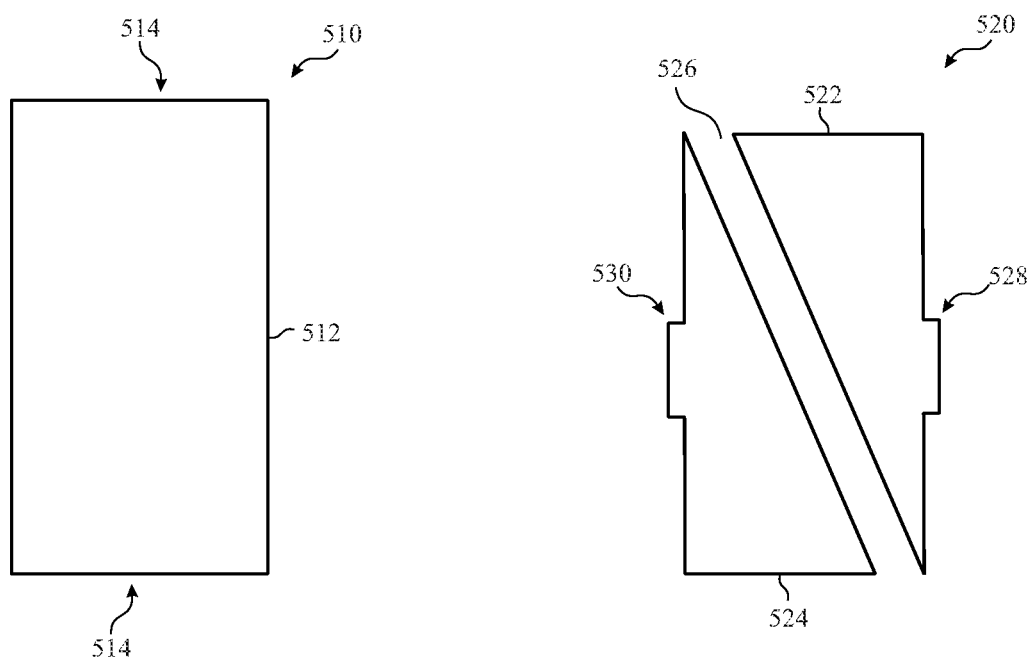
*FIG. 13B*  *FIG. 13C*

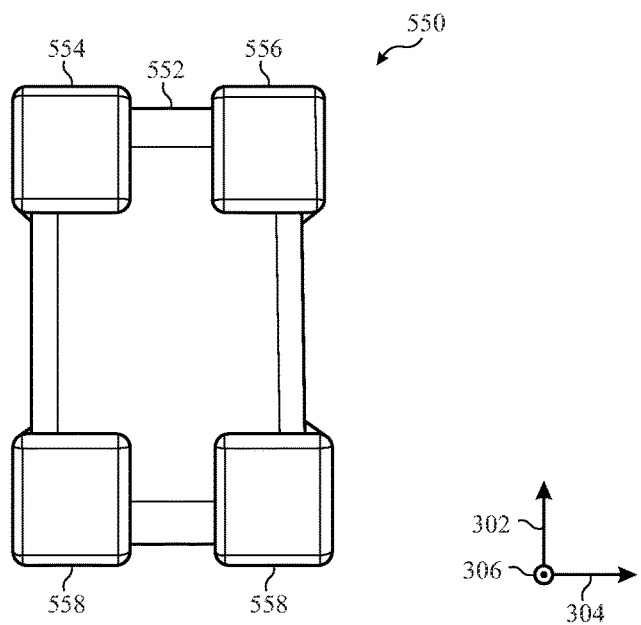
FIG. 14A
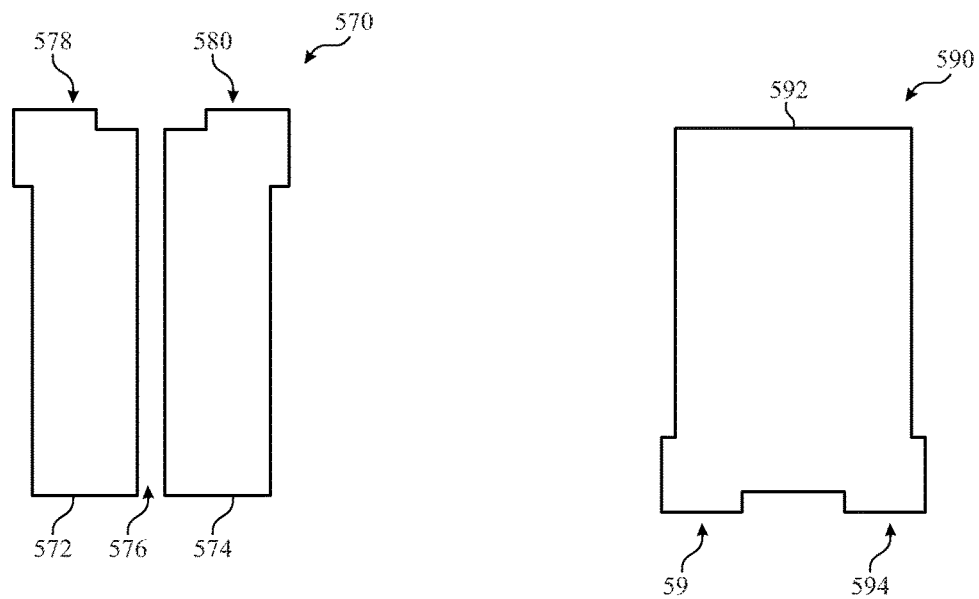
FIG. 14B
FIG. 14C

MULTILAYER CERAMIC CAPACITOR WITH LOW ACOUSTIC NOISE

BACKGROUND

The present disclosure relates generally to capacitor structures, and more particularly, to multilayer ceramic capacitors having reduced acoustic noise.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices include electronic circuits that employ capacitors for filtering, impedance matching, energy storage, and other applications. Ceramic capacitors have often been used in these electrical devices, in applications where the dimensions of the circuit boards in the device may be reduced. Due to the plasticity of the material and the high permittivity of the dielectric, ceramic capacitors may be produced in very compact and customized dimensions and shapes. For example, multilayer ceramic capacitors, e.g., ceramic capacitors having multiple electrodes forming a capacitor, may be used to obtain high capacitances in a compact package.

The materials forming the dielectric in multilayer ceramic capacitors may have a piezo-electric nature, i.e., changes in applied voltage may result in changes to the physical dimension of the capacitor. As a result, capacitors in high frequency circuits may present vibration, which may lead to generation of noise. The level of noise may be related to the frequency and voltage bias of the signal, as well as to the dielectric constant of the ceramic material. The noise may be further amplified by transmission to the circuit board that is coupled to the capacitor. While reduction of the noise may be achieved with reduction of the dielectric constant of the ceramic material, such reduction may lead to lower capacitance value and/or larger capacitor size.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments described herein are related to monolithic capacitor structures that may have reduced vibration and/or reduced acoustic noise. The monolithic capacitor structures may have a main capacitor that is coupled to an electronic device to provide a capacitive function, and a "vise" capacitor that may compensate for piezoelectric deformations in the monolithic capacitor structure due to normal capacitive function, hence the use of the term "vise" herein. In some embodiments, the vise capacitor and the main capacitor may be arranged such that the vise capacitor may provide a clamping effect. In some embodiments, the vise capacitor is arranged to provide piezoelectric deformation that is inversely proportional to that caused by the main capacitor, thus counteracting change in shape and/or size to reduce or eliminate noise. Capacitors described herein may be produced employing multilayer ceramic capacitor techniques.

Electrical circuitry that may be used with this capacitor to provide electrical signals to the vise capacitor to obtain the piezoelectric compensation are also described. These circuits may include voltage difference elements that allow the production of a compensating electrical signal with changes that are inversely proportional to the changes in the electrical signal received by the main capacitor. The circuits may include delay elements that allow a phase shift between the electrical signals received by the main and the vise capacitor, which may double the frequency of vibration and render the associated acoustic noise inaudible.

BRIEF DESCRIPTION OF THE DRAWINGS

Various aspects of this disclosure may be better understood upon reading the following detailed description and upon reference to the drawings in which:

FIG. 12A is a top view of a capacitor structure having a vise capacitor, that may be included in the electronic device of FIG. 1, in accordance with an embodiment;

FIG. 12B is a top view of a ceramic sheet that may be placed inside the capacitor structure of FIG. 12A, in accordance with an embodiment;

FIG. 12C is a top view of a second ceramic sheet that may be used in conjunction with the ceramic sheet of FIG. 12B inside the capacitor structure of FIG. 12A, in accordance with an embodiment;

FIG. 13A is a top view of a capacitor structure having a vise capacitor, that may be included in the electronic device of FIG. 1, in accordance with an embodiment;

FIG. 13B is a top view of a ceramic sheet that may be placed inside the capacitor structure of FIG. 13A, in accordance with an embodiment;

FIG. 13C is a top view of a second ceramic sheet that may be used in conjunction with the ceramic sheet of FIG. 13B inside the capacitor structure of FIG. 13A, in accordance with an embodiment;

FIG. 14A is a top view of another capacitor structure having a vise capacitor, that may be included in the electronic device of FIG. 1, in accordance with an embodiment;

FIG. 14B is a top view of a ceramic sheet that may be placed inside the capacitor structure of FIG. 14A;

FIG. 14C is a top view of a ceramic sheet that may be used in conjunction with the ceramic sheet of FIG. 14B inside the capacitor structure of FIG. 14A, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many electronic devices may employ capacitors for energy storage, tuning, impedance matching, noise filtering, and other functionalities. Certain dielectric materials in capacitors may present piezoelectric properties. For example, in ceramic capacitors, changes in voltage may lead to expansion and/or contraction of the ceramic dielectric. Such effect may be more pronounced in multilayer ceramic capacitors, where many dielectric layers are present. In applications that subject capacitors to periodic signals, piezoelectric properties of the dielectric may lead the capacitor to produce vibrations. For example, in a multilayer ceramic capacitor (MLCC) subjected to high frequency signals, piezoelectric materials may generate high frequency vibrations. This vibration may lead to discernible acoustic noise. This noise may be further amplified by a transmission of the vibration to the circuit board and/or to the electrical device casing.

Since the piezoelectric effect in a material is proportional to the electric field in the dielectric, piezoelectric vibrations from a periodic electric field may be mitigated or suppressed by a second electric field that is inversely proportional to the first periodic electric field. Monolithic capacitor structures, such as the ones described herein, may employ such principle by having a main capacitor that carries a signal and a vise capacitor that reduces or prevents vibration by subjecting the capacitor structure dielectric to a piezoelectric stimulus that compensates the one from the main capacitor. The vise capacitor, therefore, is capable of compensating dimension changes caused by the main capacitor, thus mitigating vibrations in the capacitor.

Figure 1:
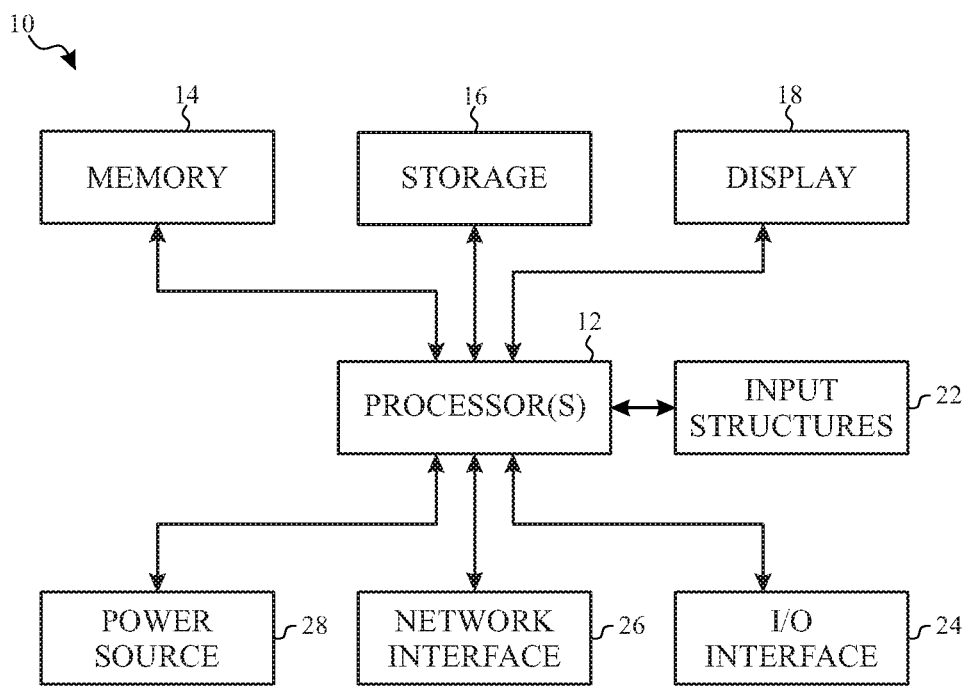
FIG. 1 is a schematic block diagram of an electronic device that may benefit from the inclusion of one or more low acoustic noise capacitor structures, in accordance with an embodiment.

With the foregoing in mind, a general description of suitable electronic devices that may employ a device having low-noise capacitor structures in its circuitry will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
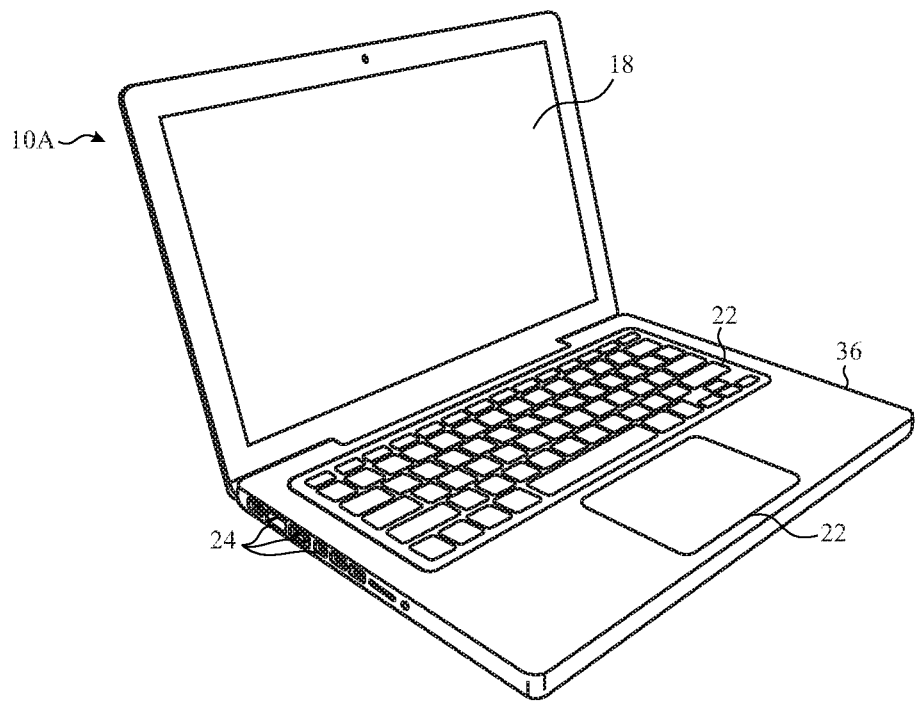
FIG. 2 is a perspective view of a notebook computer representing an embodiment of the electronic device of FIG. 1, in accordance with an embodiment.
Figure 3:
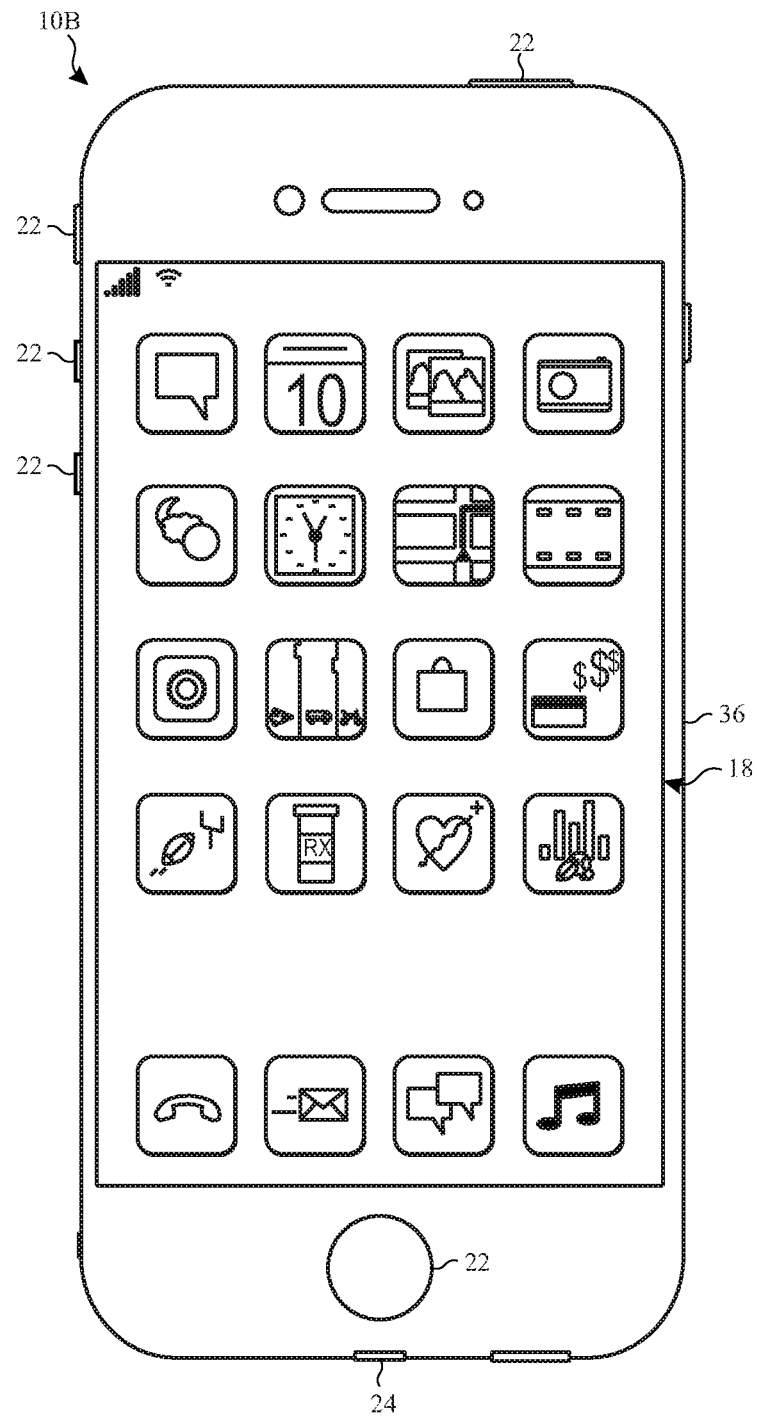
FIG. 3 is a front view of a hand-held device representing another embodiment of the electronic device of FIG. 1, in accordance with an embodiment.
Figure 4:
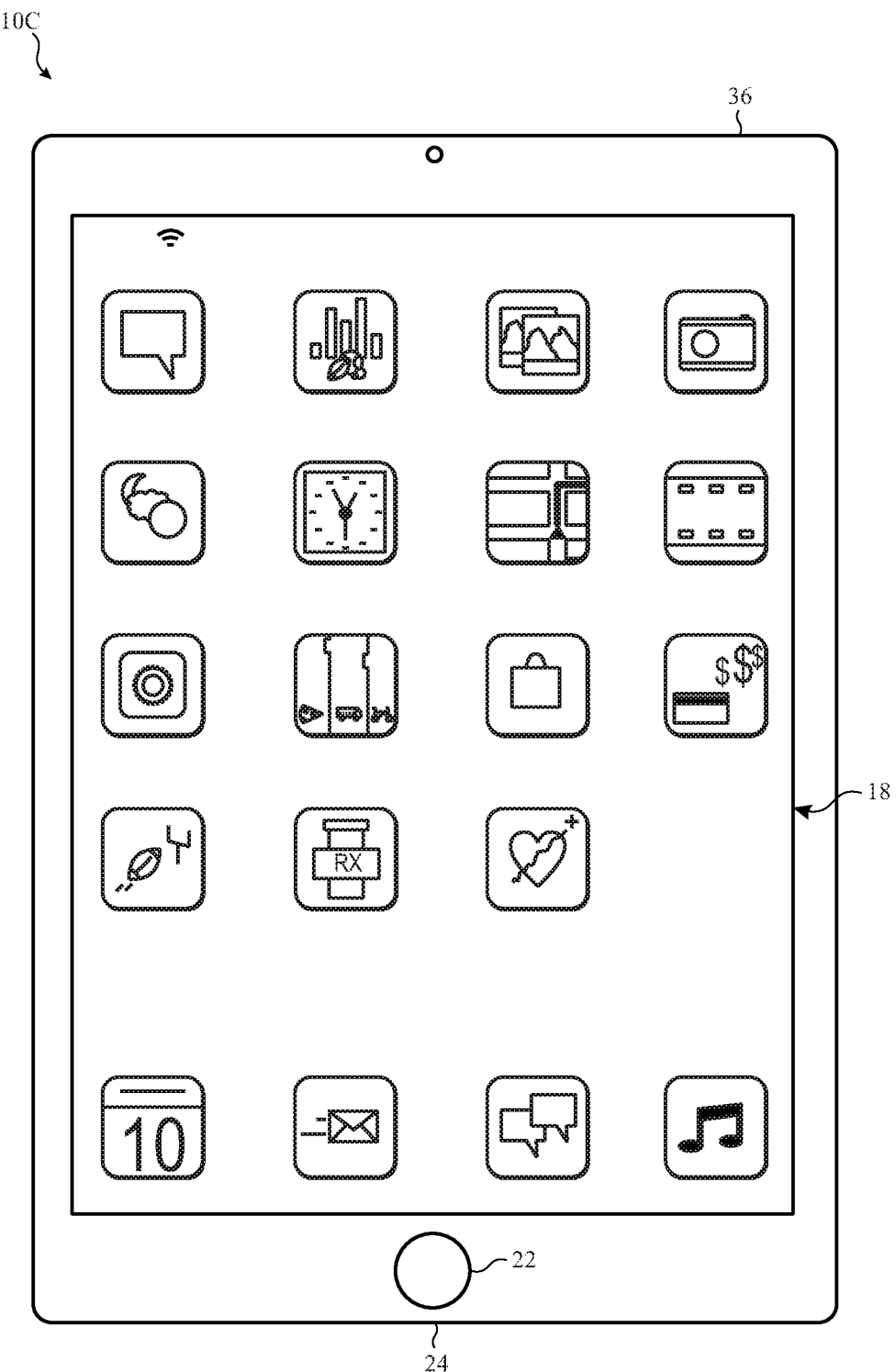
FIG. 4 is a front view of another hand-held device representing another embodiment of the electronic device of FIG. 1, in accordance with an embodiment.
Figure 5:
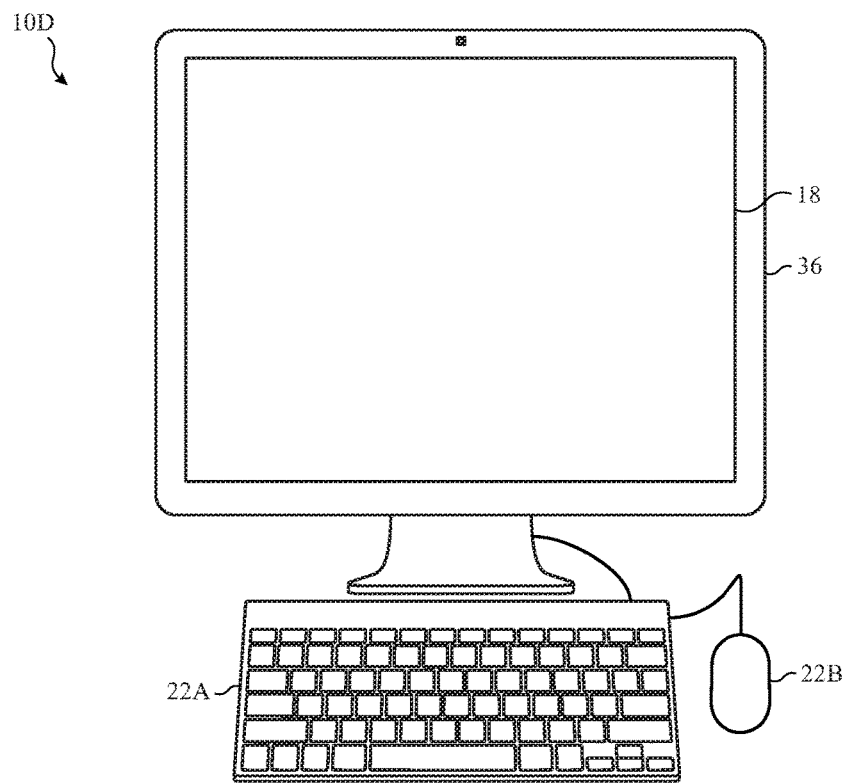
FIG. 5 is a front view of a desktop computer representing another embodiment of the electronic device of FIG. 1, in accordance with an embodiment.
Figure 6:
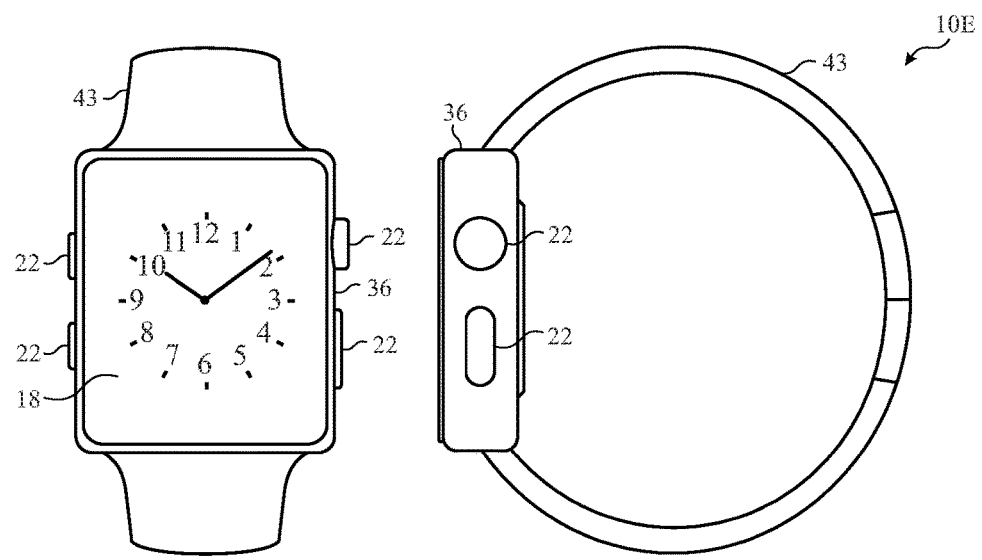
FIG. 6 is a front view and side view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. Network interfaces 26 such as the one described above may benefit from the use of tuning circuitry, impedance matching circuitry and/or noise filtering circuits that may include low-noise capacitor structures devices such as the ones described herein. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7A:
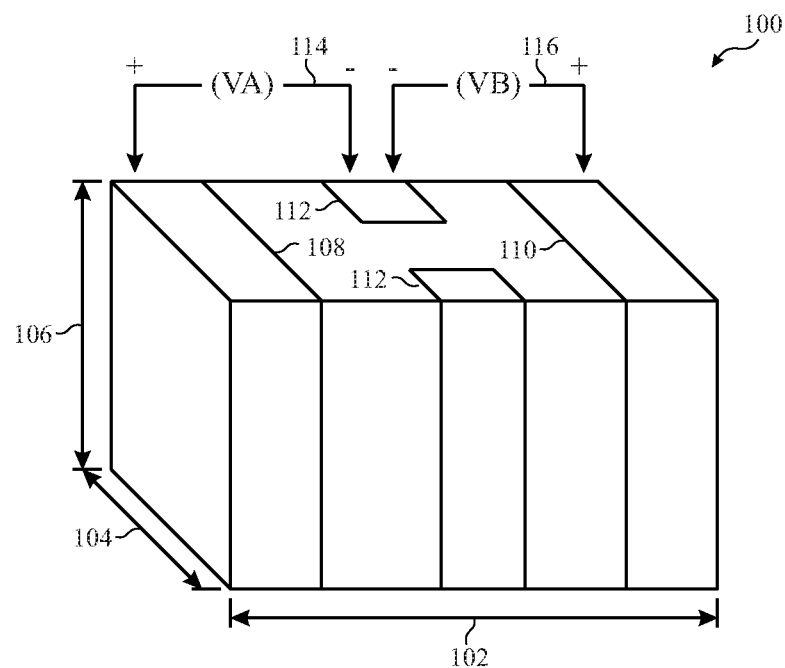
FIG. 7A is a perspective view of an embodiment for a capacitor structure having a vise capacitor in addition to a main capacitor, and may be included in the electronic device of FIG. 1, in accordance with an embodiment.
Figure 7B:
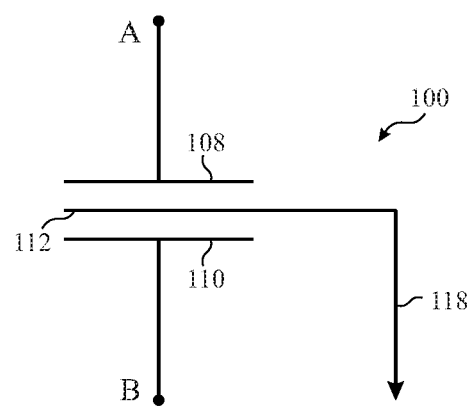
FIG. 7B is a schematic electrical diagram that illustrates a relationship between the vise capacitor and the main capacitor in the capacitor structure of FIG. 7A, in accordance with an embodiment.

Electronic devices 10A, 10B, 10C, 10D, and 10E described above may all employ low-noise capacitor structures in analog circuitry such as in tuning circuits, impedance matching circuits, power decoupling circuits, filtering circuits, amplifiers, power controllers, and other circuitry. Embodiments for capacitor structures having a main capacitor and a vise capacitor to mitigate acoustic noise from piezoelectric effects are described herein. For example, FIG. 7A illustrates a capacitor structure 100 that may have reduced piezoelectric effect. Capacitor device 100 may have a length 102, a width 104, and a height 106. Capacitor device 100 has two terminals 108 and 110 and a grounding terminal 112. The main capacitor 114 may be formed between terminal 108 and grounding terminal 112 and vise capacitor 116 may be formed between terminal 110 and grounding terminal 112. FIG. 7B provides an electrical schematic arrangement for capacitor 100. Terminal 108 may be coupled to a node A of the electrical circuit, terminal 110 may be coupled to a terminal B of the electrical circuit and grounding terminal 112 may be coupled to a ground 118.

Figure 7C:
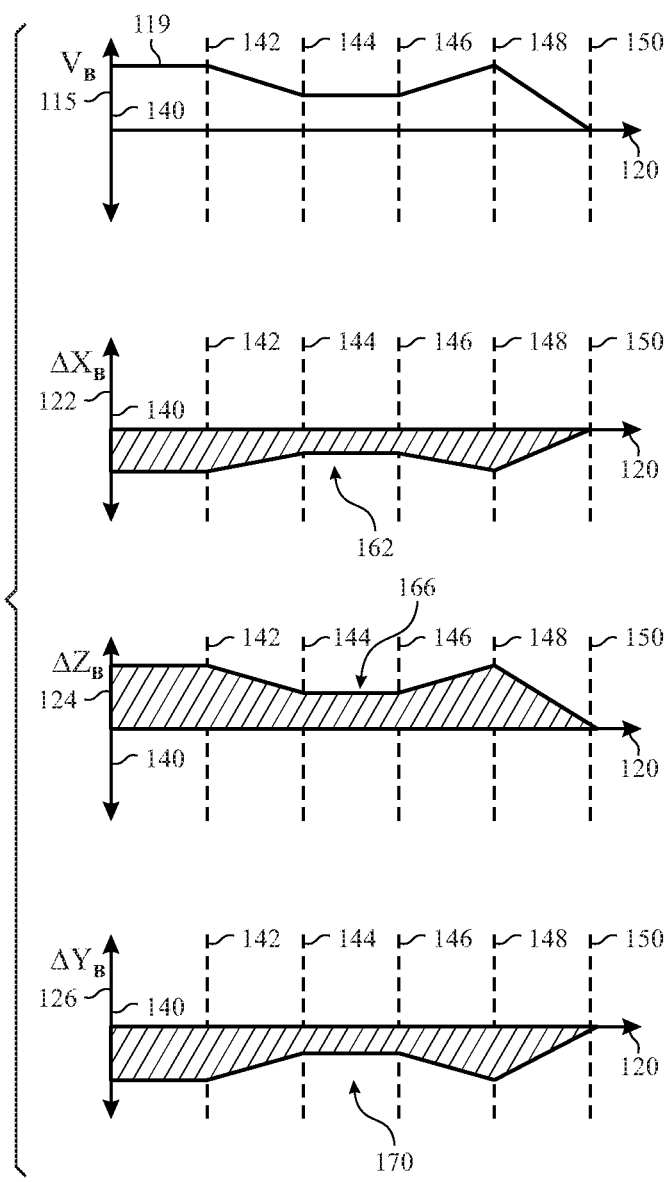
FIGS. 7C and 7D are series of charts illustrating the piezoelectric clamping effect provided by the vise capacitor in the capacitor structure of FIG. 7A, in accordance with an embodiment.
Figure 7D:
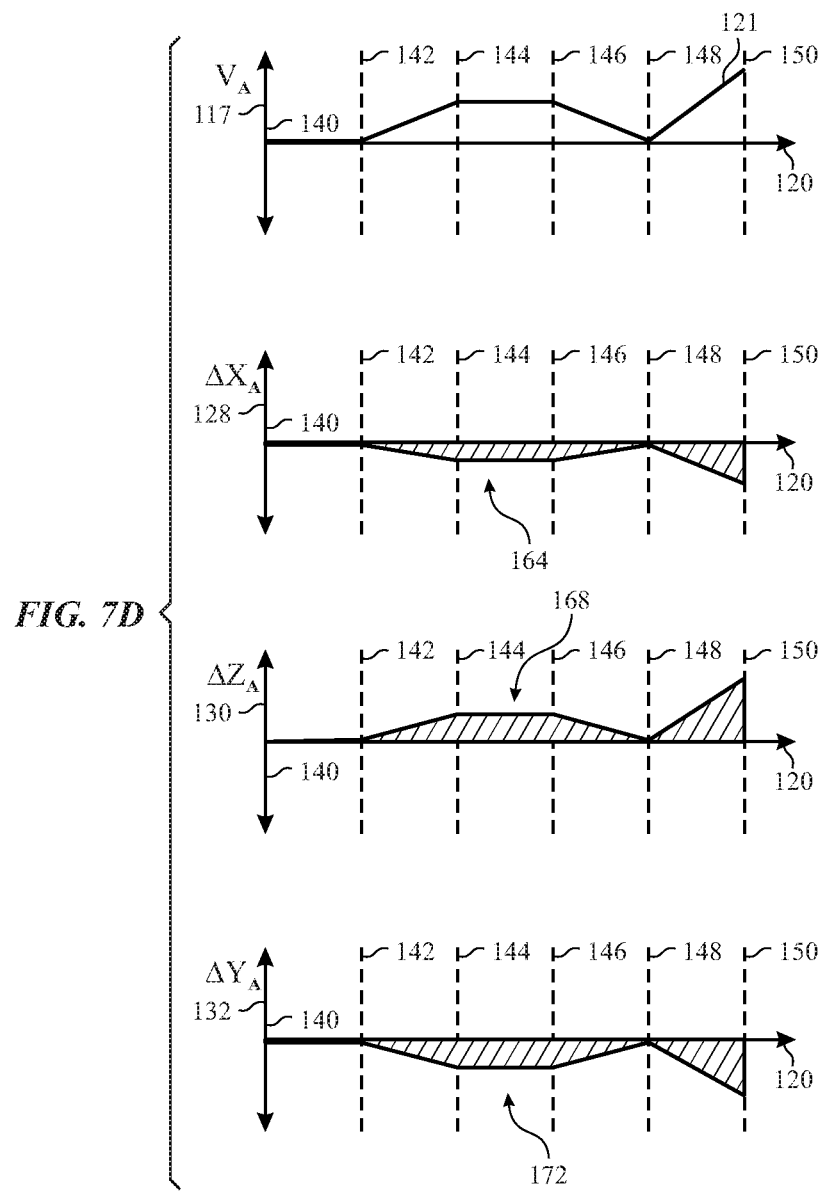

FIG. 7C illustrates, via an example, the piezoelectric clamping on dimensions 102, 104, and 106 of capacitor device 100 due to an electrical signal on the vise capacitor 114 (i.e., an electrical signal between terminal 110 and grounding terminal 112). Specifically, charts in FIG. 7C provide the voltage 115 over time 120 of an electrical signal 119 on the vise capacitor 116, as well as the compensating piezoelectric distortion in the capacitor device 100 along its length (axis 122), height (axis 124), and width (axis 126) due to variations of the electrical signal 119 on the vise capacitor 116. Similarly, FIG. 7D illustrates, via an example, the piezoelectric distortion effect that an electrical signal on the main capacitor 114 (i.e., an electrical signal between terminal 108 and grounding terminal 112) provides to dimensions 102, 104, and 106 of capacitor device 100. Specifically, charts in FIG. 7D provide the voltage 117 over time 120 of an electrical signal 121 on the main capacitor 114, as well as the piezoelectric distortion of the capacitor device 100 along its length (axis 128), height (axis 130), and width (axis 132) due to the electrical signal 121.

Electrical signal 119 on the vise capacitor 116 may be an electrical signal provided to the capacitor for clamping the dimensions of capacitor device 100 and compensate for the piezoelectric effects from the electrical signal 121 provided during regular operation of the electrical device. For example, at the initial time 140, the electrical signal 119 on vise capacitor 116 is at a maximum level, while the electrical signal 121 on the main capacitor 114 is zero. The maximum level at initial time 140 may cause the capacitor device to have maximum height (axis 124) and minimum length (axis 122) and width (axis 126). Between time 142 and time 144, as the electrical signal 121 on the main capacitor 114 increase, the electrical signal 119 drops at the same proportion. Notice that during this period, the change in electrical signal 119 makes the length distortion from the vise capacitor (axis 122) decrease, compensating the increase in length distortion due to the change in electrical signal 121. Similarly, during this period, the increase in height distortion (axis 130) by the piezoelectric effect on the main capacitor 114 is compensated by an decrease in height distortion (axis 124) from the piezoelectric effect on the vise capacitor 116, and the increase in width distortion (axis 132) is compensated by a decrease in width distortion (axis 126).

The compensatory effect may also be observed between time 146 and 148. During this period, electrical signal 119 increases to clamp the dimensions of capacitor device 100 while electrical signal 121 decreases. The decrease in electrical signal 121 lead to a decrease in the length distortion (axis 128), height distortion (axis 130), and width distortion (axis 132). To provide clamping, voltage 115 of electrical signal 119 increases leading to a compensating increase in the length distortion (axis 122), the height distortion (axis 124), and width distortion (axis 126). The examples in FIGS. 7C and 7D also show an end time 150, in which the electrical signal 119 goes to zero and the electrical signal 121 goes to a maximum. As described above, the compressions in length (region 164) and width (region 172), and the relaxation in height (region 168) caused by electrical signal 121 are compensated by the relaxations in length (region 162) and width (region 170), and the compression in height (region 166) caused by electrical signal 119. As a result of the piezoelectric compensation provided by vise capacitor 116 to distortions caused by main capacitor 114 in capacitor device 100, the changes in the dimensions of capacitor device 100 may be substantially reduced despite the piezoelectric activity.

Figure 8:
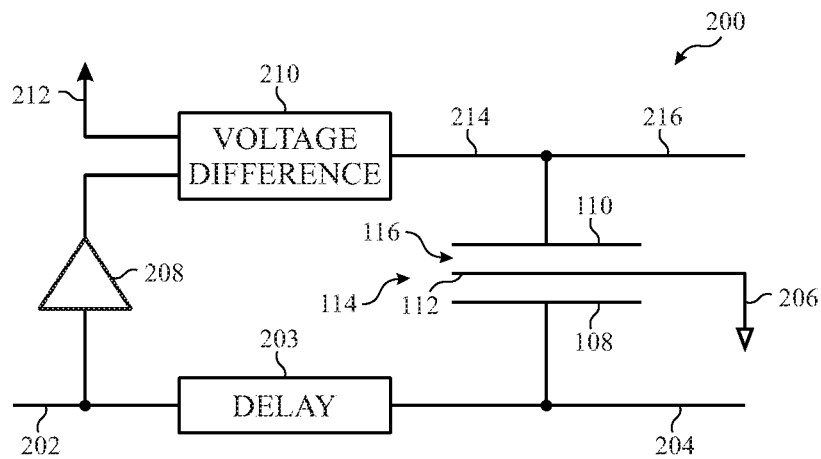
FIG. 8 is an electrical diagram of a circuit that illustrates a coupling configuration for the capacitor structure of FIG. 7A, in accordance with an embodiment.

In the above illustration, changes in the vise electrical signal 119 correspond to certain changes in the main electrical signal 119. In some implementations, the capacitor device 100 having a main and a vise capacitor may be coupled to a compensation circuitry that produces a compensating electrical signal and a main electrical signal, as illustrated by circuit 200 of FIG. 8. In the example, electrical circuit 200 may receive an input signal 202 from an electrical device and produce an output signal 204 to the electrical device that employs capacitor device 100 for its application. The input signal 202 may be filtered by the main capacitor 114 by coupling the input signal 202 to electrode 108 via a delay element 203. Grounding electrode 112 may be coupled to a ground terminal 206. Compensating circuitry, which may include the delay element 203, a buffer 208, and a voltage difference circuitry 210, produces a compensating signal 214 that, when provided to vise capacitor 116, mitigates the piezoelectric effects from input signal 202.

The input signal 202 may also enter buffer 208 and enter voltage difference circuitry 210 to produce the compensating signal 214. Compensating signal 214 may be a voltage difference between a rail 212 and the buffered input signal 202. In some implementations, the voltage difference circuitry 210 may produce a scaled difference signal as compensating signal 214, for situations in which a piezoelectric behavior of the dielectric in main capacitor 114 is different from that of the dielectric in vise capacitor 116. Note that, for proper compensation, rail 212 may provide a voltage that is higher than the maximum voltage of the input signal 202.

Note, further, that delay element 203 may be placed to account for potential lag in the transmission of the signal to buffer 208 and voltage difference circuitry 210. Note that circuit 200 may operate without delay element 203, such as when circuit 200 is capable of providing a compensating signal 214 in a fast timescale with respect to the operating frequency of the circuit. It should also be noted that circuit 200 may operate without buffer 208 if the input signal 202 is provided by a component with sufficient output impedance.

When input signal 202 has a periodic component, the piezoelectric effect due to the input signal may generate vibrations in capacitor device 100. The frequency of vibration may be similar or a harmonic of the frequency of the periodic component of input signal 202. If the vibration in capacitor device has a frequency in the hearing range (about 20 Hz to about 20 kHz), the vibrations lead to acoustic noise. As described above, the compensating signal 214 may be used to mitigate the acoustic noise by cancelling the vibration using the vise capacitor. In some implementations, delay element 203 may be adjusted to provide a phase difference between the input signal 202 and the compensating signal 214 and change the frequency of vibrations in capacitor device 100. For example, delay element 203 can provide a phase difference of 90° or 180° between input signal 202 and compensating signal 214, which may lead to a harmonic shift in the frequency of vibration in the capacitor device 100. The harmonic shift may for example, double or quadruple the frequency of vibration in capacitor device 100. For example, if the vibration frequency due to input signal 202 is in a range between 10 kHz and 20 kHz, doubling the vibration frequency using the vise capacitor may shift the vibration to higher than 20 kHz, which is outside the hearing range. As a result, the capacitor device 100 produces less discernible acoustic noise.

Figure 9A:
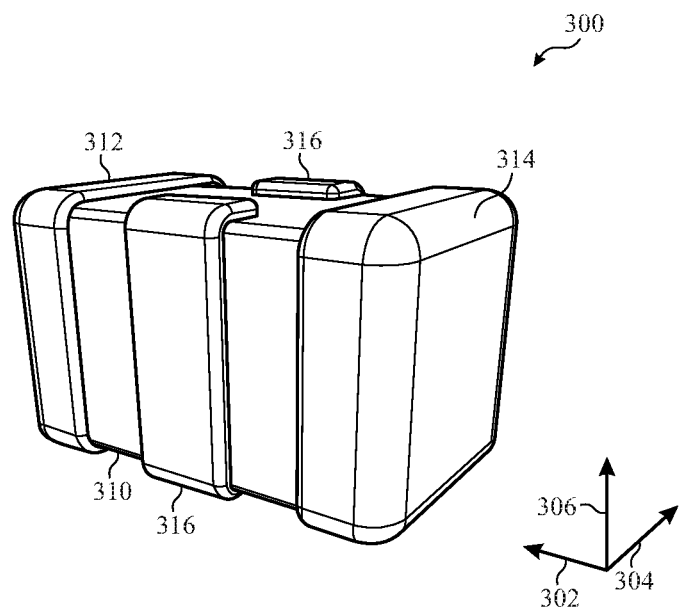
FIG. 9A is a perspective view of an embodiment for a capacitor structure having a vise capacitor that may be included in the electronic device of FIG. 1, in accordance with an embodiment.
Figure 9B:
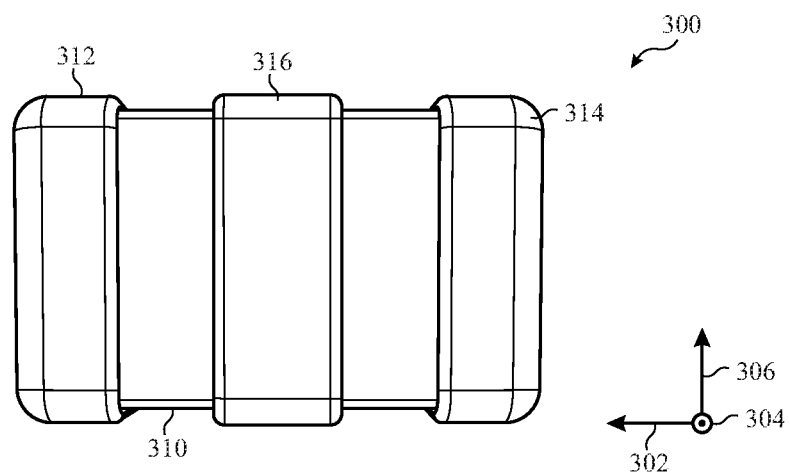
FIG. 9B is a front view of the capacitor structure of FIG. 9A, in accordance with an embodiment.

An embodiment of a monolithic capacitive device 300 having a main and a vise capacitor, such as capacitor device 100 in FIG. 7, is illustrated in the perspective view of FIG. 9A and the front view of FIG. 9B. Views of the capacitor may be oriented with respect to a width 302, a length 304, and a height 306. The main capacitor of the capacitor device 300 may be formed between main capacitor terminal 312 and grounding terminal 314. The vise capacitor of the capacitor device 300 structure may be formed between vise capacitor terminals 316 and grounding terminal 314.

Figure 9C:
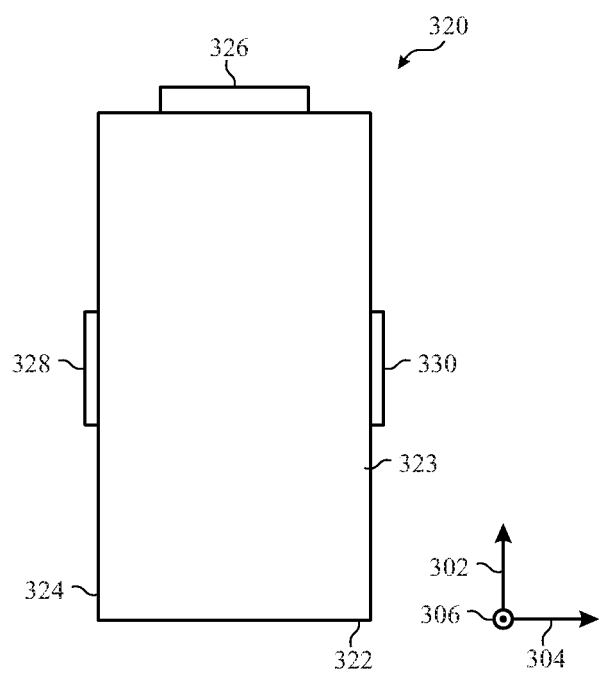
FIG. 9C is a top view of ceramic sheets that may be disposed inside the capacitor structure of FIG. 9A, in accordance with an embodiment.

An arrangement of ceramic sheets that form the electrodes of capacitive device 300 is illustrated in the top view illustrated in FIG. 9C. Top view illustrates two superimposed ceramic sheets: a ceramic sheet 320 having the main electrode 346 and the vise electrode 344 placed above a ceramic sheet 322 having the grounding electrode 323. Electrodes 344, 346, and 323 may be formed by a conductive material disposed in a top surface of a ceramic sheet. When superimposed, the body of the ceramic sheet forms a dielectric that is disposed between the electrodes. Note that, due to the design, a first region of the dielectric between main electrode 346 and grounding electrode 323 is a part of the main capacitor, while a second region of the dielectric between the vise electrode 344 and grounding electrode 323 is a part of the vise capacitor. As a result, the rigidity of the dielectric provides a mechanical support that allows the vise capacitor to compensate the piezoelectric effects from the main capacitor. If an electrical signal between the main electrode 346 and the grounding electrode 323 causes a first distortion in the first region of the dielectric, a compensating electrical signal between the vise electrode 364 and the grounding electrode 323 can cause a second distortion in the second region of the dielectric. The second distortion may counteract the effect of the first distortion and the overall dimension of the dielectric may change very little. In some embodiments, such as when periodic electrical signals causes a vibration from the first distortion, the second vibration may cause a second distortion that increases (e.g., double) the frequency of vibration in the rigid dielectric.

Figure 9D:
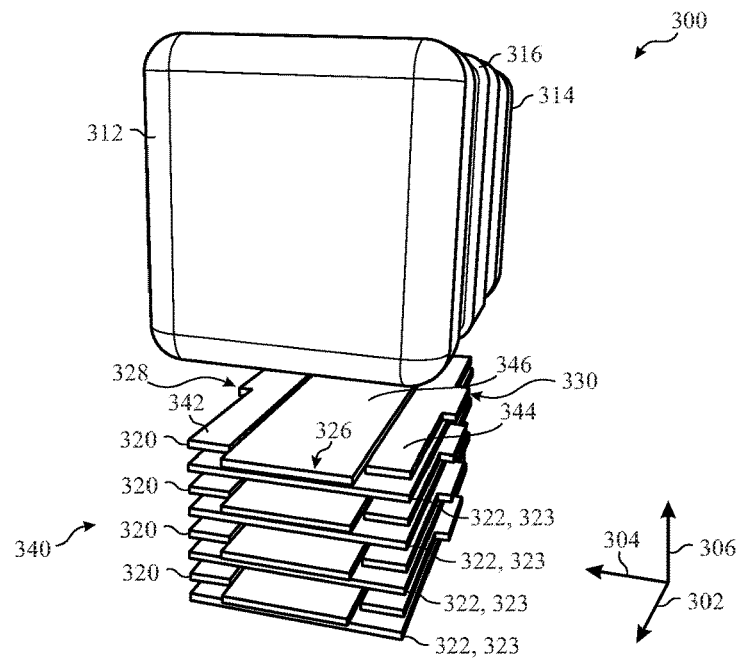
FIG. 9D is a perspective view of the capacitor structure of FIG. 9A along with an exploded view of ceramic sheets that may be disposed inside the capacitor structure of FIG. 9A, in accordance with an embodiment.
Figure 9E:
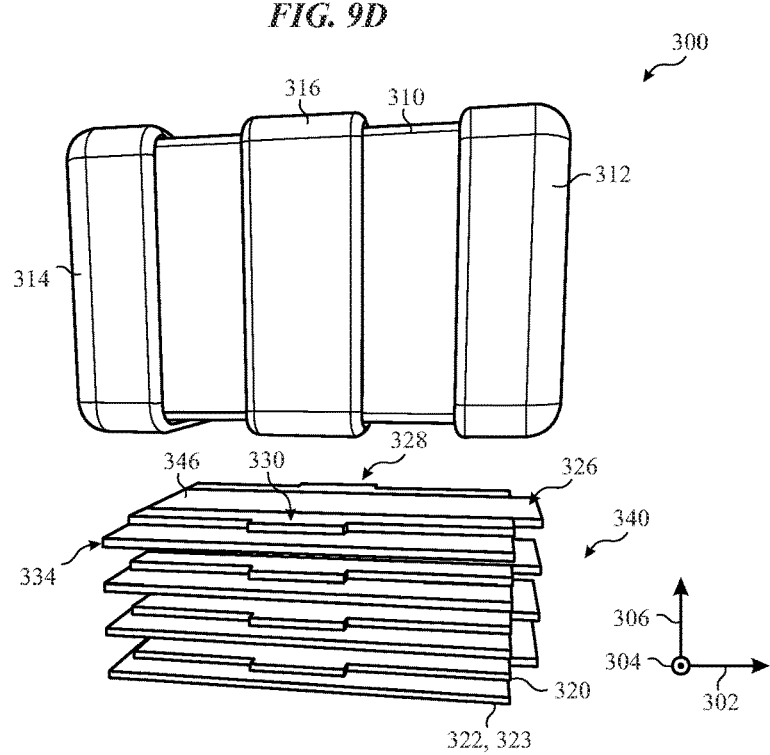
FIG. 9E is a front view of the capacitor structure of FIG. 9A along with an exploded view of ceramic sheets that may be disposed inside the capacitor structure of FIG. 9A, in accordance with an embodiment.

As illustrated, main electrode 346 may be disposed in a central portion (i.e., central relative to length 304), along width 302 of the ceramic sheet 320. The vise electrodes 342 and 344 may be disposed along width 302 in regions flanking the main electrode 346. Main electrode 346 may be separated from vise electrodes 342 and 344 by dielectric regions without a conductor. The grounding electrode may cover a majority of the surface of ceramic sheet 322, with the exception of thin regions in the boundary of ceramic sheet 322. In some implementations, grounding electrode covers the entire ceramic sheet 322. The grounding electrode 323 of ceramic sheet 322 may be coupled to grounding terminal 314 via a lip 324. Lip 326 of a main electrode 346 may be coupled to main capacitor terminal 312, and lips 328 and 330 of the vise capacitor electrodes may be coupled to the vise capacitor terminals 316. This arrangement of the ceramic sheets 320 and 322 is further illustrated in the perspective view of FIG. 9D and the front view of FIG. 9E. FIGS. 9D and 9E provide an illustration of the orientation of the ceramic sheet stack 340 within capacitor structure 300. It should be noted that the ceramic sheet stack 340 may be placed within the case of capacitor structure 300. In both FIGS. 9D and 9E, ceramic sheet stack has 4 ceramic sheets 320 having main electrode 346 and vise electrodes 342 and 344, and 4 ceramic sheets 322 having a grounding electrode 323.

Figure 10A:
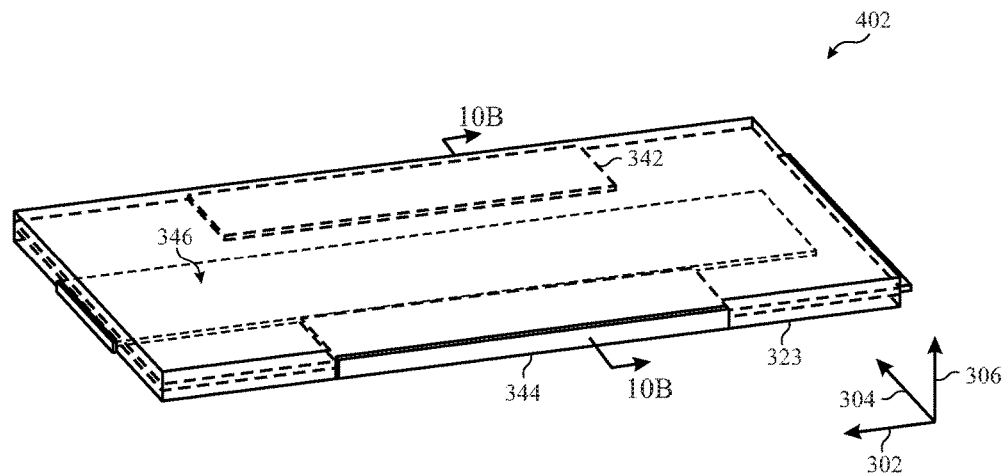
FIG. 10A is a perspective view of an alternative embodiment for ceramic sheets that may be disposed inside the capacitor structure of FIG. 9A, in accordance with an embodiment.
Figure 10B:
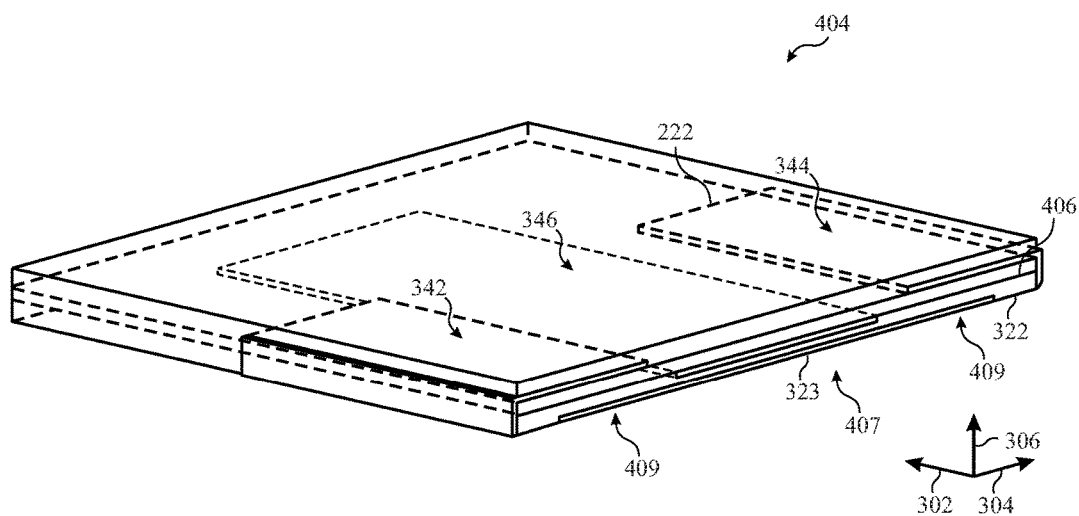
FIG. 10B is a cross section view of the ceramic sheets of FIG. 10A, in accordance with an embodiment.

To illustrate the effect of the piezoelectric compensation provided by the vise capacitor, FIG. 10A provides an illustration 402 of two pressed ceramic sheets such as the ones illustrated above and FIG. 10B provides a cross-section view 404. As illustrated above, main electrode 346 is located along the center of the ceramic sheet and vise electrodes 342 and 346 are locate in the sides of the ceramic sheet. Grounding electrode 323 is located in a second ceramic sheet under main electrode 346 and vise electrodes 342 and 346. Note that in MLCCs, the electrodes are produced by coating ceramic sheets with a conductive material, and a dielectric, such as dielectric 406, is produced from the ceramic sheet itself. During operation, a signal in the main capacitor may generate changes in the difference of voltage between main electrode 346 and grounding electrode 323, which may generate piezoelectric pressure in region 407. As illustrated above, a compensatory signal in the vise capacitor may generate an opposite change in the difference of voltage between vise electrodes 342 and 344 and grounding electrode 323, which may generate an opposite piezoelectric pressure in regions 409. Due to the rigidity of dielectric region 406, the opposite piezoelectric pressures may compensate one another resulting in no distortion in capacitor 300.

Figure 11A:
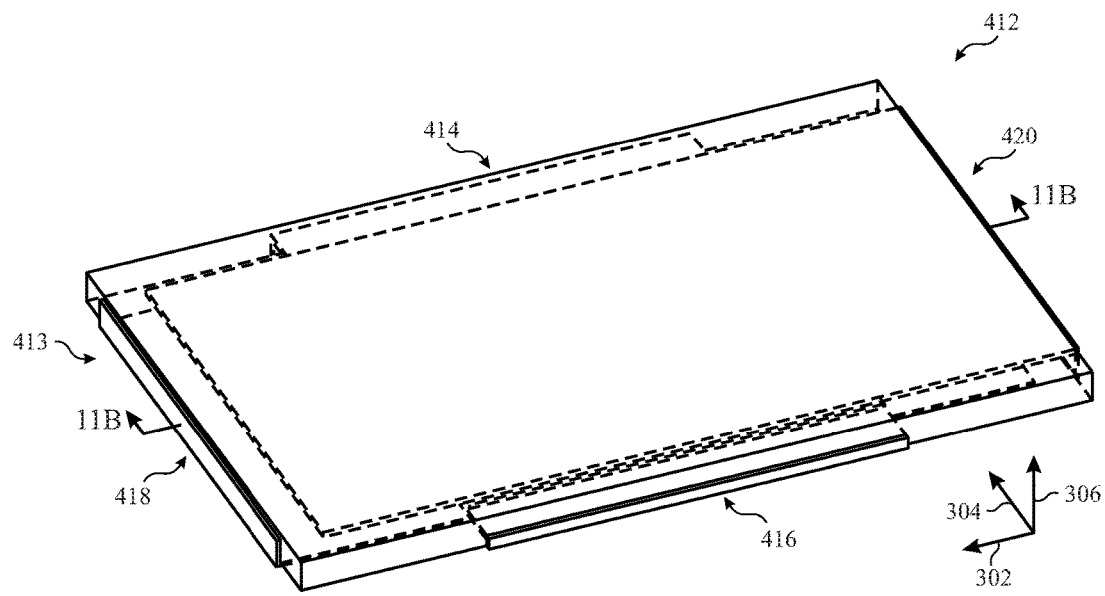
FIG. 11A is a perspective view of an alternative embodiment for ceramic sheets that may be disposed inside the capacitor structure of FIG. 9A, in accordance with an embodiment.
Figure 11B:
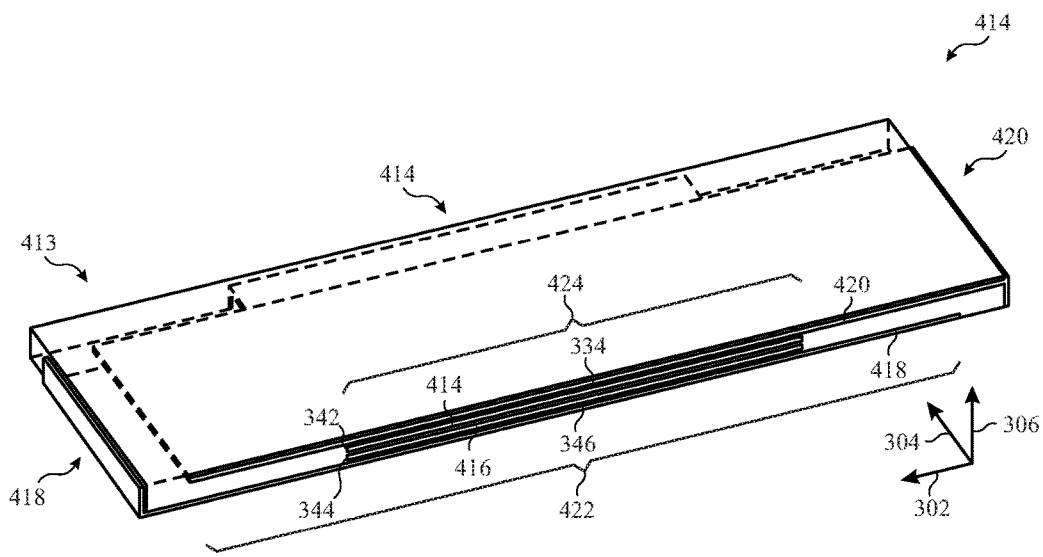
FIG. 11B is a cross section view of the ceramic sheets of FIG. 11A, in accordance with an embodiment.

While the above references discuss capacitor structures having a common ground, embodiments for a capacitor structure having independent main and vise capacitors may also be obtained. Perspective view 412 of FIG. 11A illustrate a ceramic sheet arrangement 413 which may be used to obtain such a capacitor structure. In sheet arrangement 413, a main capacitor may be formed between by electrodes 414 and 416, and a vise capacitor may be formed between electrodes 418 and 420. Note that electrodes 418 and 420 may generate piezoelectric pressure (e.g., clamping) in a region 422 that surrounds the region 424, where piezoelectric pressure by electrodes 414 and 416 occur. The reduction in piezoelectric vibration in a capacitor structure that employs ceramic sheet arrangement 413 may be a result of this clamping effect in a larger area. As a result, in this design the compensatory signal may be smaller than the main signal, which reduces the energy spent by the compensation mechanism that employs a vise capacitor.

Other ceramic sheet arrangements may be employed to provide the clamping mechanism illustrated above in capacitors having a common ground. Capacitor structure 450 illustrated in FIG. 12A may have a main capacitor between termination 452 and ground terminations 456, and a vise capacitor between termination 458 and ground terminations 456. Ceramic sheet 460 of FIG. 12B may have a grounding electrode 462 and lips 464 that may couple to grounding terminations 456. Grounding electrode 462 covers a majority of ceramic sheet 460. Ceramic sheet 470 of FIG. 12C may have a triangular main electrode 472 with a lip 476 that may couple to termination 454, and a triangular vise electrode 474 with a lip 478 that may couple to termination 458. Note that ceramic sheet 470 has a dielectric diagonal strip 471 that separates triangular main electrode 472 from triangular vise electrode 474 and does not have a conductive material in its surface.

FIG. 13A illustrates another embodiment of a capacitor structure 500 that provides the clamping mechanism described above. Capacitor structure 500 may have a main capacitor between termination 506 and grounding terminations 504, and a vise capacitor between termination 508 and grounding terminations 504. Ceramic sheet 510 of FIG. 13B may have a grounding electrode 512 having lips 514 that may couple to grounding terminations 504 and ceramic sheet 520 of FIG. 13C may have a triangular main electrode 522 and a triangular vise electrode 524, with respective lips 528 and 530 that couple to termination 506 and 508, respectively. Grounding electrode 512 covers a majority of ceramic sheet 510. Moreover, triangular main electrode 522 and triangular vise electrode 524 are separated by dielectric diagonal strip 526. As illustrated above, piezoelectric pressure caused by an electric signal in the main capacitor of capacitor structures 450 and 500 may be compensated by an inverse pressure caused by a compensating electric signal in the vise capacitor.

Figure 14D:
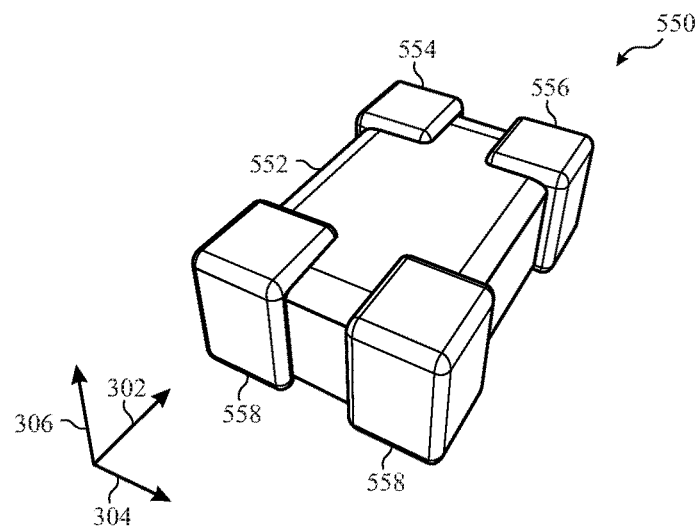
FIG. 14D is a perspective view of the capacitor structure of FIG. 14A, in accordance with an embodiment.
Figure 14E:
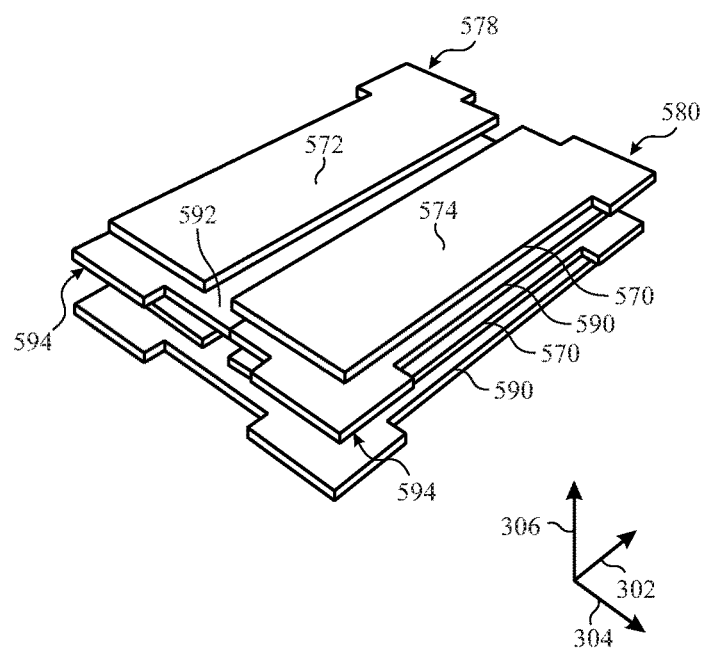
FIG. 14E is a perspective view of an arrangement of the ceramic sheets of FIGS. 14B and 14C placed inside the capacitor structure of FIG. 14A, in accordance with an embodiment.

An embodiment for a capacitor structure 550 having a different arrangement for the terminations is illustrated in FIG. 14A. In capacitor structure 550, terminations are disposed in the case 552. In the system the main capacitor may be formed between terminations 554 and grounding termination 558, and the vise capacitor may be formed between terminations 556 and grounding terminations 558. The capacitor structure 550 may be formed by stacks of ceramic sheet 570, illustrated in FIG. 14B, and ceramic sheet 540, illustrated in FIG. 14C. Ceramic sheet 570 may have a main electrode 572 with a lip 578 that couples to termination 554, and a vise electrode 574 with a lip 580 that couples to termination 556. A dielectric strip 576 disposed widthwise (e.g. along width 302) splits the ceramic sheet 570 in two lateral portions, which may have the same side. Main electrode 574 and vise electrode 574 may be located in one of these portions. Ceramic sheet 590 may have a grounding electrode 592 having lips 594 that couple to terminations 558. FIGS. 14D and 14 provides illustrations of the capacitor structure 550 in perspective. FIG. 14D illustrates the view of the case 552 along with terminations 554, 556, and 558, and FIG. 14E illustrates a stack arrangement formed by two ceramic sheets 570 and two ceramic sheets 590 that may be placed within case 552. It should be noted that monolithic capacitor structures 450, 500, and 550 have a symmetrical design and, therefore, the main capacitor and the vise capacitor are interchangeable.

Figure 15:
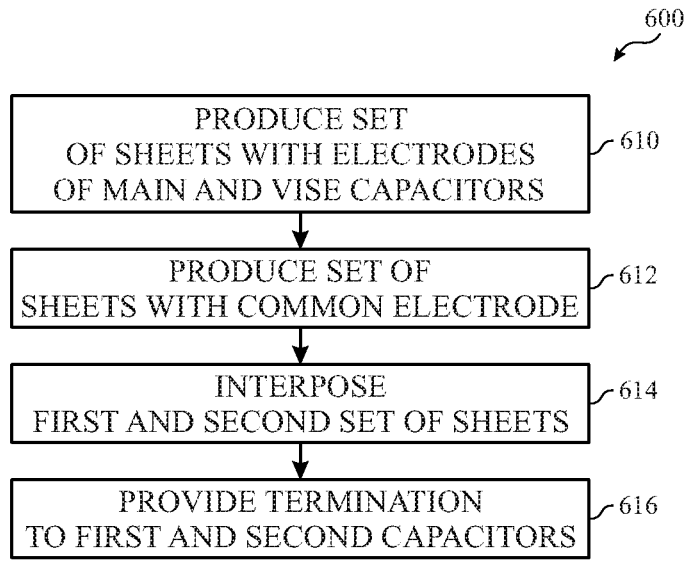
FIG. 15 is a flow chart of a method to produce a capacitor structure having a vise capacitor, such as the ones illustrated in FIGS. 7, 9, 12, 13, and 15, in accordance with an embodiment.

With the foregoing in mind, the flow chart 600 in FIG. 15 illustrates a method to assemble a MLCC having a main capacitor that performs a capacitive function (e.g., filtering, storing energy, etc.) in a circuit, and a vise capacitor that compensates physical changes to the MLCC from piezoelectric effects. In a process 610, sheets that having the electrodes that correspond to the main and the vise capacitors (e.g., main electrodes and vise electrodes) may be produced. In a process 312, sheets having the common electrode (e.g., grounding electrode) may be produced. Note that the production of electrodes may take place by coating (e.g., stenciling) regions of the ceramic sheet with conductive materials, such as paste. Sheets produced in process 610 and 612 may be interposed to form a sheet stack. As described above, the dielectric may be formed by the ceramic material of the sheets. The rigidity of the specific choice of materials for the sheet may be chosen to improve the compensatory piezoelectric effect described above. In a process 616, the sheet stack may be pressed, encased, and metallic terminations may be added to any exposed electrode surface in the outer side of the MLCC case.

Figure 16:
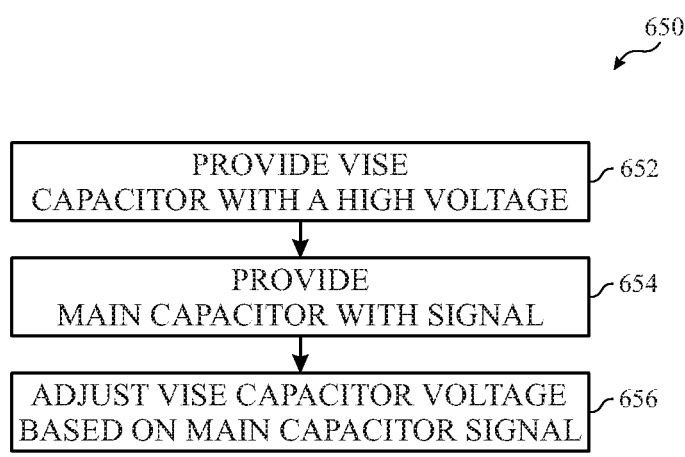
FIG. 16 is a flow chart of a method to employ a capacitor structure with a main capacitor and a vise capacitor in an electrical circuit of an electrical such as that of FIG. 1.

In order to compensate piezoelectric effects using the vise capacitor, a compensatory signal may be produced for the vise capacitor. Flow chart 650 of FIG. 16 illustrates a method to use a capacitor structure with a main and a vise capacitor in an electric circuit. The vise capacitor may be provided with a high voltage to facilitate the compensation (process 652). Biasing the vise capacitor with a high voltage may allow voltage decreases in the vise capacitor, as the main capacitor is subjected to an electric signal that may cause piezoelectric deformation in the capacitor structure. In the course of operation of the electric device, the main capacitor may be provided with an electric signal (process 654). In many implementations, the electric signal may be a high frequency signal. At the same time, the voltage provided to the vise capacitor may be adjusted based on the electric signal provided to the main capacitor (process 656).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising a capacitor device coupled to electrical circuitry, wherein the capacitor device comprises:
   a first ceramic sheet;
   a second ceramic sheet;
   a rigid dielectric disposed between the first ceramic sheet and the second ceramic sheet;
   a main capacitor that comprises a first electrode disposed in the first ceramic sheet, a second electrode disposed in the second ceramic sheet, and a first portion of the rigid dielectric, wherein the main capacitor is configured to receive a first electric signal, and wherein the first electrode is coupled to a first termination of the capacitor device and the second electrode is coupled to a second termination of the capacitor device; and a vise capacitor that comprises a third electrode disposed in the first ceramic sheet, the second electrode, and a second portion of the rigid dielectric, wherein the third electrode is coupled to a third termination of the capacitor device and the vise capacitor is configured to receive a second electrical signal that decreases a deformation of the rigid dielectric caused by the first electric signal; and wherein the electrical circuitry is configured to provide the first electrical signal to the main capacitor via the first terminal and the second terminal, and the second electrical signal to the vise capacitor via the second terminal and the third terminal, and wherein the second electrical signal is based on the first electrical signal.

2. The system of claim 1, wherein the first electrode comprises a central portion along a width of a surface of the first ceramic sheet and the third electrode comprises two flanking portions along the width of the surface of the first ceramic sheet.

3. The system of claim 1, wherein a surface of the first ceramic sheet comprises a dielectric diagonal strip that separates the surface of the first ceramic sheet into a first triangular portion and a second triangular portion, the first electrode comprises the first triangular portion, and the third electrode comprises the second triangular portion.

4. The system of claim 1, wherein a surface of the first ceramic sheet comprises a dielectric widthwise strip that separates the surface of the first ceramic sheet into a first lateral portion and a second lateral portion, the first electrode comprises the first lateral portion, and the second electrode comprises the second lateral portion.

5. The system of claim 1, wherein the second electrode comprises a majority of a surface of the second ceramic sheet.

6. The system of claim 1, wherein the capacitor device comprises a multilayer ceramic capacitor.

7. An electrical device, comprising:

a monolithic capacitor structure comprising a first capacitor that comprises a first terminal and a second terminal and a second capacitor that comprises a third terminal and the second terminal, wherein the first capacitor comprises a first portion of a rigid dielectric and the second capacitor comprises a second portion of the rigid dielectric;

application circuitry configured to provide an electrical signal to the first capacitor via the first terminal and the second terminal, wherein the electrical signal causes a first piezoelectric distortion in the first portion of the rigid dielectric; and compensation circuitry configured to provide a compensating electrical signal to the second capacitor via the second terminal and the third terminal, wherein the compensating electrical signal is generated based on the electrical signal and is configured to cause a second piezoelectric distortion in the second portion of the rigid dielectric that compensates the first piezoelectric distortion.

8. The electrical device of claim 7, wherein the electrical signal comprises a frequency between 20 Hz and 20 kHz.

9. The electrical device of claim 7, wherein the compensation circuitry is configured to apply a maximum voltage to the second capacitor while the application circuitry applies zero voltage to the first capacitor, and wherein the compensating electrical signal comprises a difference between the maximum voltage and the electrical signal with respect to the maximum voltage.

10. The electrical device of claim 7, wherein the first piezoelectric distortion causes a vibration of the rigid dielectric at a first frequency and the compensating electrical signal comprises a phase shift from the electrical signal that is configured to cause the rigid dielectric to vibrate at a frequency that is approximately two times the first frequency.

11. The electrical device of claim 10, wherein the phase shift is 90 degrees or 180 degrees.

12. The electrical device of claim 10, wherein the first frequency is above 10 kHz and below 20 kHz.

13. The electrical device of claim 7, wherein the compensation circuitry comprises a voltage difference circuitry that receives a rail voltage, the electrical signal, and provides the compensating electrical signal to the second capacitor.

14. The electrical device of claim 7, where the second terminal of the monolithic capacitor structure is coupled to a ground of the electrical device.

15. The electrical device of claim 7, wherein the monolithic capacitor structure comprises a multilayer ceramic capacitor.

16. The electrical device of claim 7, wherein the compensation circuitry causes a reduction of a vibration of the monolithic capacitor structure, a reduction of an acoustic noise of the monolithic capacitor structure, or both.

17. The electrical device of claim 7, wherein the electrical device comprises a portable computer, a tablet, personal media player, a portable phone, a wearable computer, or a wearable exercise monitor.

* * * * *